US007302674B1

(12) United States Patent
Gladieux et al.

(10) Patent No.: US 7,302,674 B1
(45) Date of Patent: Nov. 27, 2007

(54) AUTOMATING DOCUMENT REVIEWS IN A PROJECT MANAGEMENT SYSTEM

(75) Inventors: Ted Franklin Gladieux, Irvine, CA (US); Avinash Sadhu, Mission Viejo, CA (US)

(73) Assignee: Unisys Corporation, Blue Bell, PA (US)

( * ) Notice: Subject to any disclaimer, the term of this patent is extended or adjusted under 35 U.S.C. 154(b) by 598 days.

(21) Appl. No.: 10/636,923

(22) Filed: Aug. 6, 2003

Related U.S. Application Data

(63) Continuation-in-part of application No. 10/306,604, filed on Nov. 26, 2002, now Pat. No. 7,155,700, and a continuation-in-part of application No. 10/306,601, filed on Nov. 26, 2002, now Pat. No. 7,159,206, and a continuation-in-part of application No. 10/306,602, filed on Nov. 26, 2002, now Pat. No. 7,174,348.

(60) Provisional application No. 60/456,376, filed on Mar. 20, 2003.

(51) Int. Cl.
*G06F 9/44* (2006.01)

(52) U.S. Cl. .......................... 717/101; 705/9; 715/511; 707/104.1

(58) Field of Classification Search ................ 717/101; 705/9; 715/511; 707/104.1
See application file for complete search history.

(56) References Cited

U.S. PATENT DOCUMENTS 4,875,162 A * 10/1989 Ferriter et al. ................. 705/29
4,942,527 A * 7/1990 Schumacher .................... 705/9
5,172,313 A * 12/1992 Schumacher .................... 705/7
5,530,861 A * 6/1996 Diamant et al. ................. 705/8
5,548,506 A * 8/1996 Srinivasan ...................... 705/8
5,649,105 A * 7/1997 Aldred et al. ................ 709/220
5,765,140 A * 6/1998 Knudson et al. ................. 705/9
5,800,181 A * 9/1998 Heinlein et al. ............. 434/322
5,826,252 A * 10/1998 Wolters et al. .................. 707/1
5,907,490 A * 5/1999 Oliver ......................... 700/90
5,950,217 A * 9/1999 Heinlein et al. ............. 715/530
5,995,940 A * 11/1999 Ramaley ....................... 705/9
6,055,551 A * 4/2000 Heinlein et al. ............. 715/530
6,212,549 B1 * 4/2001 Page et al. .................. 709/205
6,295,513 B1 * 9/2001 Thackston ..................... 703/1
6,308,164 B1 * 10/2001 Nummelin et al. .............. 705/9
6,321,204 B1 * 11/2001 Kazami et al. ................. 705/7
6,370,562 B2 * 4/2002 Page et al. .................. 709/204
6,389,462 B1 * 5/2002 Cohen et al. ................ 709/218
6,487,469 B1 * 11/2002 Formenti ..................... 700/97

(Continued)

OTHER PUBLICATIONS

Microsoft Project Version 4.1 User's Guide, 1995, Whole Manual.*

(Continued)

*Primary Examiner*—Todd Ingberg
(74) *Attorney, Agent, or Firm*—Phuong-Quan Hoang; Robert P. Marley; Charles A. Johnson

(57) ABSTRACT

An embodiment of the present invention is a technique to automate document review in a project management tool. The review information on a document review is stored in a repository. The document review is associated to a project in a project management system. The document review is processed using the review information. A notification of the document review is sent.

30 Claims, 10 Drawing Sheets

U.S. PATENT DOCUMENTS

| | | | | |
|---|---|---|---|---|
| 6,609,100 | B2 * | 8/2003 | Smith et al. | 705/8 |
| 6,701,378 | B1 * | 3/2004 | Gilhuly et al. | 709/249 |
| 6,732,296 | B1 * | 5/2004 | Cherny et al. | 714/32 |
| 6,769,013 | B2 * | 7/2004 | Frees et al. | 709/205 |
| 6,782,305 | B2 * | 8/2004 | Liteplo et al. | 700/182 |
| RE38,633 | E * | 10/2004 | Srinivasan | 707/10 |
| 6,854,088 | B2 * | 2/2005 | Massengale et al. | 715/764 |
| 6,859,781 | B1 * | 2/2005 | Gloor et al. | 705/7 |
| 6,892,192 | B1 * | 5/2005 | Geddes et al. | 706/14 |
| 6,928,396 | B2 * | 8/2005 | Thackston | 703/1 |
| 7,069,093 | B2 * | 6/2006 | Thackston | 700/97 |
| 7,162,528 | B1 * | 1/2007 | Simonoff et al. | 709/229 |

OTHER PUBLICATIONS

WFMC The Workflow Magement Coalition Speficiation, The Workflow Reference Model, Document No. TC00-1003, Jan. 19, 1995, David Hollongsworth, Whole Manual.*

WFMC The Workflow Magement Coalition Speficiation, Terminalogy& Glossary, Document No. TC00-1011, Feb. 1999, 1995, Whole Manual.*

WFMC The Workflow Magement Coalition Speficiation, Workflow Client Application (Interface 2) Application Programming Interface (WAPI) Specification, Doc. No. TC00-1009, May 15, 1996, Whole Manual.*

Privacy, Anonymity and Interpersonal Competition Issues Identified During Particapatory Design of Project Management Groupware, Michael J Muller et al, Jan. 1991, ACM SIGCHI Bulletin, pp. 82-87.*

"Productive Objects An Applied Software Project Management Framework", Robert J. Muller, Aug. 1, 1997, Whole book.*

Core JSP, Damon Hougland et al, pp. 1-17, published Oct. 6, 2000.*

Coating User Manuals for Use In Collaborative Design, Harold Thimblely et al, ACM, 1996, pp. 279-280.*

Hardware/ Software CoDesign: A Perspective, David W. Frankie et al, IEEE, 1991, pp. 344-352.*

Introduction To Networking, $2^{nd}$ Edition, Que, Berry Nance, 1993, pp. 114-115, 138.*

Avi Sadhu, Unisys Corporation, Rain In That Monster Of A Process With Modern Web-Based Tools, Project World Conference, San Jose, California.

* cited by examiner

… (1)

AUTOMATING DOCUMENT REVIEWS IN A PROJECT MANAGEMENT SYSTEM

CROSS-REFERENCE TO RELATED APPLICATIONS

This application is a continuation-in-part application of the following patent applications: "Creating Customized Objects For Processes In Project Management", Ser. No. 10/306,604, filed on Nov. 26, 2002 now U.S. Pat. No. 7,155,700; "Automated Process Execution For Project Management", Ser. No. 10/306,601, filed on Nov. 26, 2002 now U.S. Pat. No. 7,159,206; "Collaborating Activities Using Customized Objects For Project Management", Ser. No. 10/306,602, filed on Nov. 26, 2002 now U.S. Pat. No. 7,174,348. This application claims the benefit of the provisional application entitled "Project Management Using Customized Objects", Ser. No. 60/456,376 filed on Mar. 20, 2003, and is related to the following patent applications: Ser. No. 10/636,924 entitled "Generation Of Java Language Application Programming Interface For An Object-Oriented Data Store"; Ser. No. 10/636,959 entitled "Capturing Traceability Information Between Artifacts Produced By A Project Management Software"; Ser. No. 10/636,955 entitled "Instantiating A Project In A Project Management System"; Ser. No. 10/636,961 entitled "Implementing Web-Based Wizards In Distributed Web Applications"; Ser. No. 10/636,962 entitled "Implementing Complex Client-Side Graphical User Interface Controls In Distributed Web Applications"; Ser. No. 10/636,951 entitled "Synchronizing Data Between A Data Store And A Project Management Client Tool"; Ser. No. 10/636,852 entitled "Tracking Status Of Task In A Project Management Tool"; Ser. No. 10/636,953 entitled "Customizing And Automating Checklists In Project Management"; Ser. No. 10/636,952 entitled "Controlling Access To Projects In A Project Management System"; Ser. No. 10/636,945 entitled "Customizing And Automating Entry And Exit Criteria In A Project Management System"; Ser. No. 10/636,946 entitled "Sending Notifications To Project Members In A Project Management System", all filed on the same date and assigned to the same assignee as the present application, the contents of each of which are herein incorporated by reference.

BACKGROUND

1. Field of the Invention

Embodiments of the invention relate to the field of management software, and more specifically, to project management.

2. Description of Related Art

Project management is becoming more and more complex. In enterprise applications, the sizes of projects are typically quite large, including complex databases and involving a large number of participants. The complex interactions among the various team members, process flows, tools, and databases have created difficulties to project managers. The project manager has to keep track of the progress of the project, communicate with stake holders, during the initiation, planning, executing, controlling, and closing phases of a project. Team members have to use the tools of the trade, exchange ideas, generate and review project documentations and/or reports, update information, communicate with the project manager regarding progress of their work, etc.

Existing techniques for project management have a number of drawbacks. First, most traditional techniques are not convenient to users or team members because of lack of support and/or interface to Web-based information sharing. Second, the project information may not be well structured or organized. Users do not have a common format or platform to organize data or information and trace sources of data and information. Third, workflow/process automation is non-existent.

In an enterprise project development, project members are usually required to follow a documented process. One of the processes common to many organizations is the review or inspection of design artifacts created during the project development. Existing techniques rely on a manual process for recording which participants review, approve, or disapprove documents. One such manual process is to fill out forms by participants and filing these forms in a project log book. These techniques are inefficient, slow, tedious, and time-consuming. Project members sometimes do not know if a review has been done or when a review should start.

SUMMARY OF THE INVENTION

An embodiment of the present invention is a technique to automate document review in a project management tool. The review information on a document review is stored in a repository. The document review is associated to a project in a project management system. The document review is processed using the review information. A notification of the document review is sent.

BRIEF DESCRIPTION OF THE DRAWINGS

The invention may best be understood by referring to the following description and accompanying drawings that are used to illustrate embodiments of the invention. In the drawings.

DESCRIPTION

An embodiment of the present invention is a technique to automate document review in a project management tool. The review information on a document review is stored in a repository. The document review is associated to a project in a project management system. The document review is processed using the review information. A notification of the document review is sent.

In the following description, numerous specific details are set forth. However, it is understood that embodiments of the invention may be practiced without these specific details. In other instances, well-known circuits, structures, and techniques have not been shown in order not to obscure the understanding of this description.

Figure 1A:
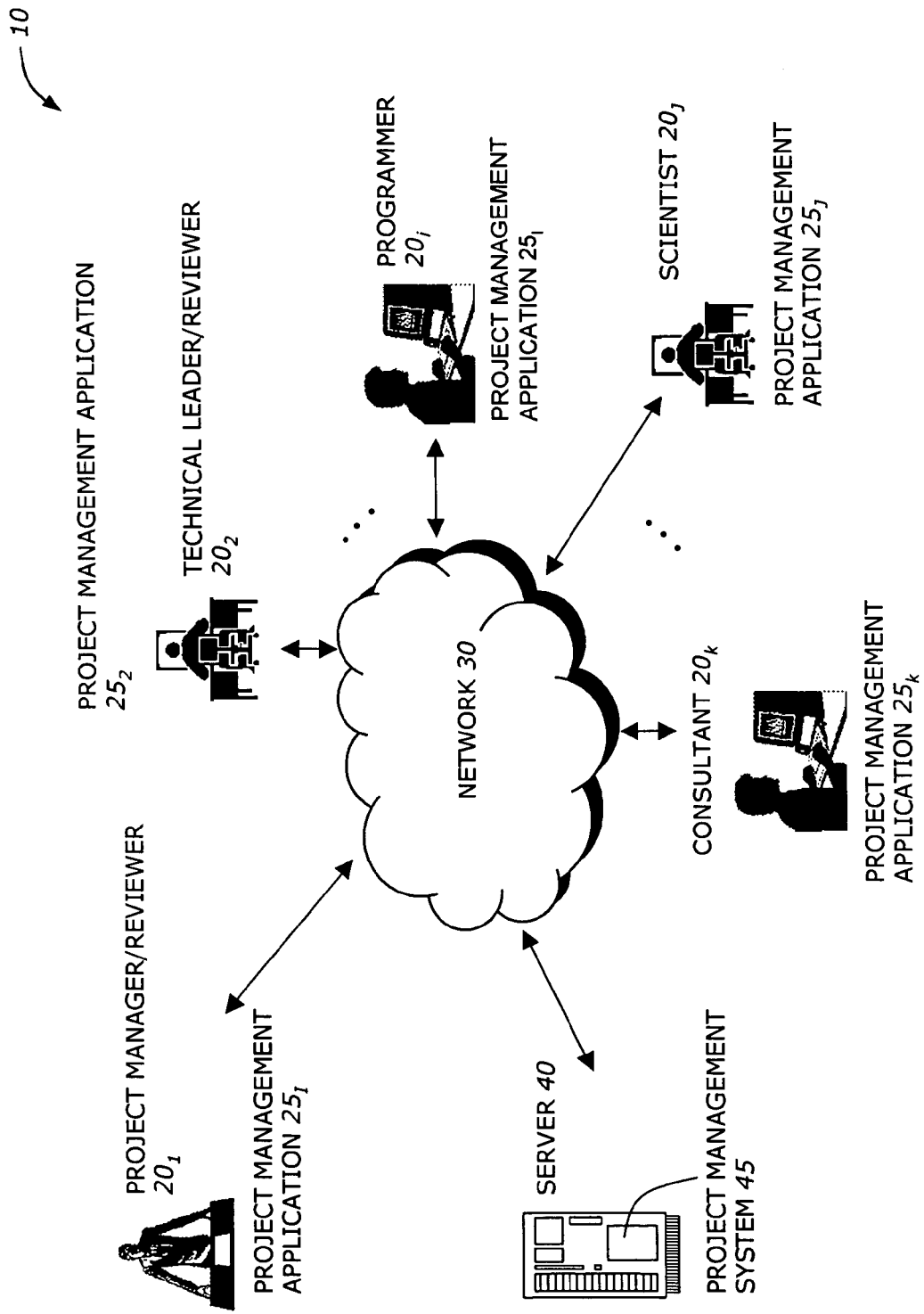
FIG. 1A is a diagram illustrating a project environment in which one embodiment of the invention can be practiced.

FIG. 1A is a diagram illustrating a project environment 10 in which one embodiment of the invention can be practiced. The project environment 10 includes project members $20_1$ to $20_K$, a network 30, and a server 40.

The project members may include a project manager $20_1$, a technical leader $20_2$, a programmer $20_i$, a scientist $20_j$, and a consultant $20_K$. A person may have one or more roles. Each member may be assigned one or more tasks in one or more phases of a project. Each member has access to a project management application $25_i$ to $25_K$, respectively. The project management application may be located in the computer used by the member.

The network 30 may be any suitable network that links the project members $20_i$ to $20_K$. The network 30 may be an Internet, intranet, extranet, wireless fidelity (Wi-Fi), local area network (LAN), wide area network (WAN), etc. The network 30 allows project members to communicate with each other and to access the project management application. The server 40 is connected to the network 30 and contains a project management system 45 that provides the tools for users to construct, create, or instantiate a project.

Figure 1B:
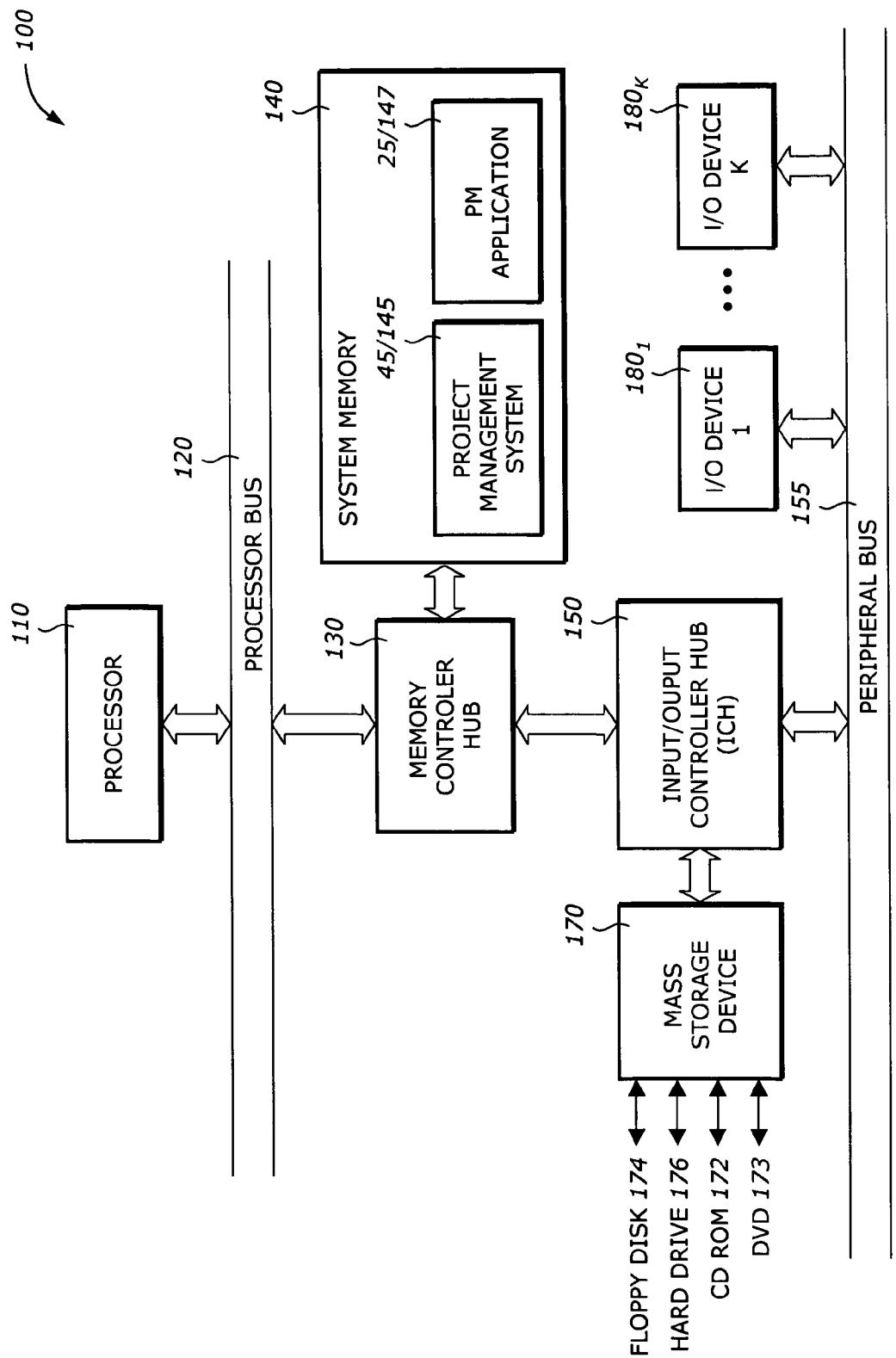
FIG. 1B is a diagram illustrating a computer system according to one embodiment of the invention.

FIG. 1B is a diagram illustrating a computer system 100 in which one embodiment of the invention can be practiced. The system 100 includes a processor 110, a processor bus 120, a memory control hub (MCH) 130, a system memory 140, an input/output control hub (ICH) 150, a peripheral bus 155, a mass storage device 170, and input/output devices $180_1$ to $180_K$. Note that the system 100 may include more or less elements than these elements.

The processor 110 represents a central processing unit of any type of architecture, such as embedded processors, mobile processors, micro-controllers, digital signal processors, superscalar computers, vector processors, single instruction multiple data (SIMD) computers, complex instruction set computers (CISC), reduced instruction set computers (RISC), very long instruction word (VLIW), or hybrid architecture.

The processor bus 120 provides interface signals to allow the processor 110 to communicate with other processors or devices, e.g., the MCH 130. The host bus 120 may support a uni-processor or multiprocessor configuration. The host bus 120 may be parallel, sequential, pipelined, asynchronous, synchronous, or any combination thereof.

The MCH 130 provides control and configuration of memory and input/output devices such as the system memory 140 and the ICH 150. The MCH 130 may be integrated into a chipset that integrates multiple functionalities such as the isolated execution mode, host-to-peripheral bus interface, memory control. The MCH 130 interfaces to the peripheral bus 155. For clarity, not all the peripheral buses are shown. It is contemplated that the system 100 may also include peripheral buses such as Peripheral Component Interconnect (PCI), accelerated graphics port (AGP), Industry Standard Architecture (ISA) bus, and Universal Serial Bus (USB), etc.

The system memory 140 stores system code and data. The system memory 140 is typically implemented with dynamic random access memory (DRAM) or static random access memory (SRAM). The system memory may include program code or code segments implementing one embodiment of the invention. The system memory includes a project management system 45 or application 25. Any one of the elements of the project management system 45 or application 25 may be implemented by hardware, software, firmware, microcode, or any combination thereof. The system memory 140 may also include other programs or data which are not shown, such as an operating system. The project management system 45 or application 25 may implement all or part of the project management functions. The project management system 45 or application 25 may also simulate the project management functions. The project management system 45 or application 25 contains instructions that, when executed by the processor 110, causes the processor to perform the tasks or operations as described in the following.

The ICH 150 has a number of functionalities that are designed to support I/O functions. The ICH 150 may also be integrated into a chipset together or separate from the MCH 130 to perform I/O functions. The ICH 150 may include a number of interface and I/O functions such as PCI bus interface to interface to the peripheral bus 155, processor interface, interrupt controller, direct memory access (DMA) controller, power management logic, timer, system management bus (SMBus), universal serial bus (USB) interface, mass storage interface, low pin count (LPC) interface, etc.

The mass storage device 170 stores archive information such as code, programs, files, data, databases, applications, and operating systems. The mass storage device 170 may include compact disk (CD) ROM 172, a digital video/ versatile disc (DVD) 173, floppy drive 174, and hard drive 176, and any other magnetic or optic storage devices such as tape drive, tape library, redundant arrays of inexpensive disks (RAIDs), etc. The mass storage device 170 provides a mechanism to read machine-accessible media. The machine-accessible media may contain computer readable program code to perform tasks as described in the following.

The I/O devices $180_1$ to $180_K$ may include any I/O devices to perform I/O functions. Examples of I/O devices $180_1$ to $180_K$ include controller for input devices (e.g., keyboard, mouse, trackball, pointing device), media card (e.g., audio, video, graphics), network card such as Institute of Electrical and Electronics Engineers (IEEE) 802.3, IEEE-1394, IEEE-802.11x, Bluetooth, and any other peripheral controllers.

Elements of one embodiment of the invention may be implemented by hardware, firmware, software or any combination thereof. The term hardware generally refers to an element having a physical structure such as electronic, electromagnetic, optical, electro-optical, mechanical, electromechanical parts, etc. The term software generally refers to a logical structure, a method, a procedure, a program, a routine, a process, an algorithm, a formula, a function, an expression, etc. The term firmware generally refers to a logical structure, a method, a procedure, a program, a routine, a process, an algorithm, a formula, a function, an expression, etc that is implemented or embodied in a hardware structure (e.g., flash memory, ROM, EROM). Examples of firmware may include microcode, writable control store, micro-programmed structure. When implemented in software or firmware, the elements of an embodiment of the present invention are essentially the code segments to perform the necessary tasks. The software/ firmware may include the actual code to carry out the operations described in one embodiment of the invention, or code that emulates or simulates the operations. The program or code segments can be stored in a processor or machine accessible medium or transmitted by a computer data signal embodied in a carrier wave, or a signal modulated by a carrier, over a transmission medium. The "processor readable or accessible medium" or "machine readable or accessible medium" may include any medium that can store, transmit, or transfer information. Examples of the processor readable or machine accessible medium include an electronic circuit, a semiconductor memory device, a read only memory (ROM), a flash memory, an erasable ROM (EROM), a floppy diskette, a compact disk (CD) ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc. The machine accessible medium may be embodied in an article of manufacture. The machine accessible medium may include data that, when accessed by a machine, cause the machine to perform the operations described in the following. The machine accessible medium may also include program code embedded therein. The program code may include machine readable code to perform the operations described in the following. The term "data" here refers to any type of information that is encoded for machine-readable purposes. Therefore, it may include program, code, data, file, etc.

All or part of an embodiment of the invention may be implemented by hardware, software, or firmware, or any combination thereof. The hardware, software, or firmware element may have several modules coupled to one another. A hardware module is coupled to another module by mechanical, electrical, optical, electromagnetic or any physical connections. A software module is coupled to another module by a function, procedure, method, subprogram, or subroutine call, a jump, a link, a parameter, variable, and argument passing, a function return, etc. A software module is coupled to another module to receive variables, parameters, arguments, pointers, etc. and/or to generate or pass results, updated variables, pointers, etc. A firmware module is coupled to another module by any combination of hardware and software coupling methods above. A hardware, software, or firmware module may be coupled to any one of another hardware, software, or firmware module. A module may also be a software driver or interface to interact with the operating system running on the platform. A module may also be a hardware driver to configure, set up, initialize, send and receive data to and from a hardware device. An apparatus may include any combination of hardware, software, and firmware modules.

One embodiment of the invention may be described as a process which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a program, a procedure, a method of manufacturing or fabrication, etc.

Figure 2:
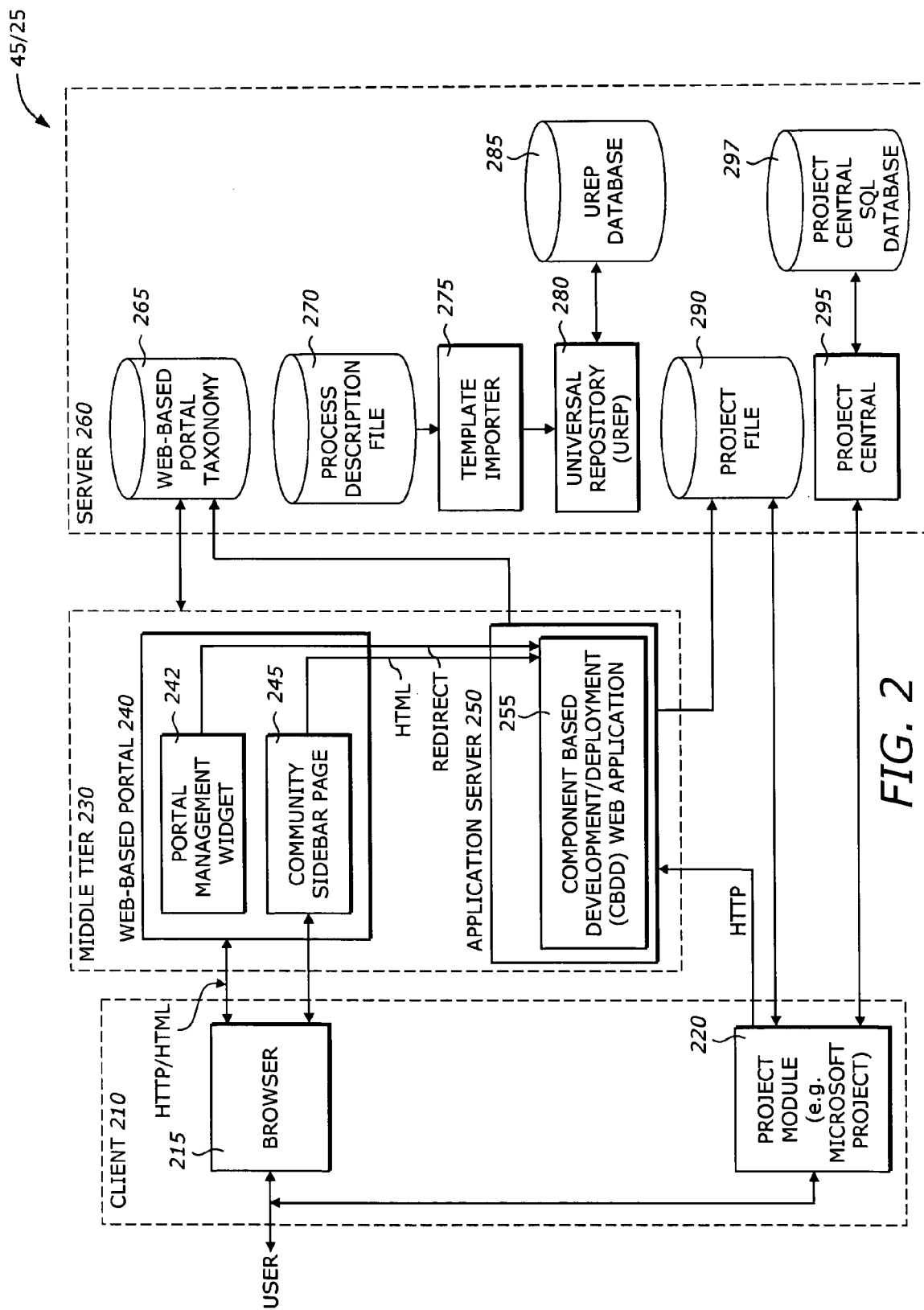
FIG. 2 is a diagram illustrating a project management system/application according to one embodiment of the invention.

FIG. 2 is a diagram illustrating a project management system/application 25/45 according to one embodiment of the invention. The project management system/application 25/45 includes a client 210, a middle tier 230, and a server 260.

The client 210 includes an application accessible to the user or the project team member. The application is typically installed or located at the user's computer system. The client 210 includes a browser 215 and a project module 220. The browser 215 is a Web-based browser that allows the user to navigate the project management system to carry out tasks for project management. The project module 220 is a software or an application designed to provide basic tools for management of projects or workflow. The project module 220 may have any of the following features: creating reports, charts, schedules, calendars; sending and receiving information on project task status and assignment; viewing, editing, and grouping resources; integrating spreadsheets, databases; tracking project progress; etc. In one embodiment, the project module 220 is the Microsoft Project Central, Project 2000 software package.

The middle tier 230 may be implemented at the client 210 or the server 260 and includes a web-based portal 240 and an application server 250. The web-based portal 240 provides tools to manage links for navigation in a Web-based environment. The web-based portal 240 includes a portal management widget 242 and a community sidebar page 245. The portal management widget 242 is in essence a Hyper-Text Markup Language (HTML) file that contains HTML code. It is a set of related links that can appear on a user's portal page and provides links to other components, such as project frame set page when used for portal maintenance, and new project web wizard for initial project configuration. The community sidebar page 245 provides links to the project module database, and to the project frame set page when used for on-going project management. The application server 250 is an enterprise software that provides application infrastructure for the overall project management system such as CBDD. It serves as an interface layer between the user interface and the system databases and/or other server components. In one embodiment, the application server 250 is the WebLogic server which provides basic application server functions and services such as transaction management, security, messaging, database connectivity, resource pooling, etc. Typically, the application server 250 is fully compliant with the industry standard, such as Java 2 Enterprise Edition (J2EE) version 1.3, and is portable across various hardware and operating systems including UNIX, Linux, Windows, etc. The application server 250 supports programming standards to build an application infrastructure, including eXtensible Markup Language (XML), Simple Object Access Protocol (SOAP), Web Services Definition Language (WSDL), etc. The CBDD web application 255 uses the services of the application server 250 to provide a user interface and application logic for the present invention.

The server 260 provides functions at the server side. The server 260 includes a web-based portal taxonomy 265, a process description file 270, a template importer 275, a universal repository (UREP) 280, a UREP database 285, a project file 290, a central project module 295, and a project database 297. The web-based portal taxonomy 265 provides tools to create or publish documents to any topic of the newly generated taxonomy. The taxonomy generation may include generation of elements for various phases in a project such as requirement phase, feasibility phase, design phase, development phase, integration and qualification phase, and support phase. The process description file 270 includes files that are created by user to describe elements of the project. The template importer 275 is a utility to import a process template into the UREP 280 and create the corresponding objects and references needed to represent that process in the UREP 280. The template importer 275 is also used to import global data which are not project-related. Examples of global data include module level notifications and global access control functions. In one embodiment, the process template data is expressed as a XML file. The UREP 280 is a metadata database, a data store, or repository information model that defines the information that can be stored in the repository database 285. It may also identify the services, tool, and technology models supported by the system. The UREP database 285 is a metadata database that stores the repository information. Note that the term repository refers to any type of data store, storage, database, etc.

The project file 290 is a directory that saves generated project files. The project file is used to manage tasks, assignments, and schedules inside the project module 220. The central project 295 is a project management software module that is located at the server. The project central database 297 stores files, information, and data used by the central project 295. In one embodiment, the central project 295 is the Microsoft Project Central.

Figure 3:
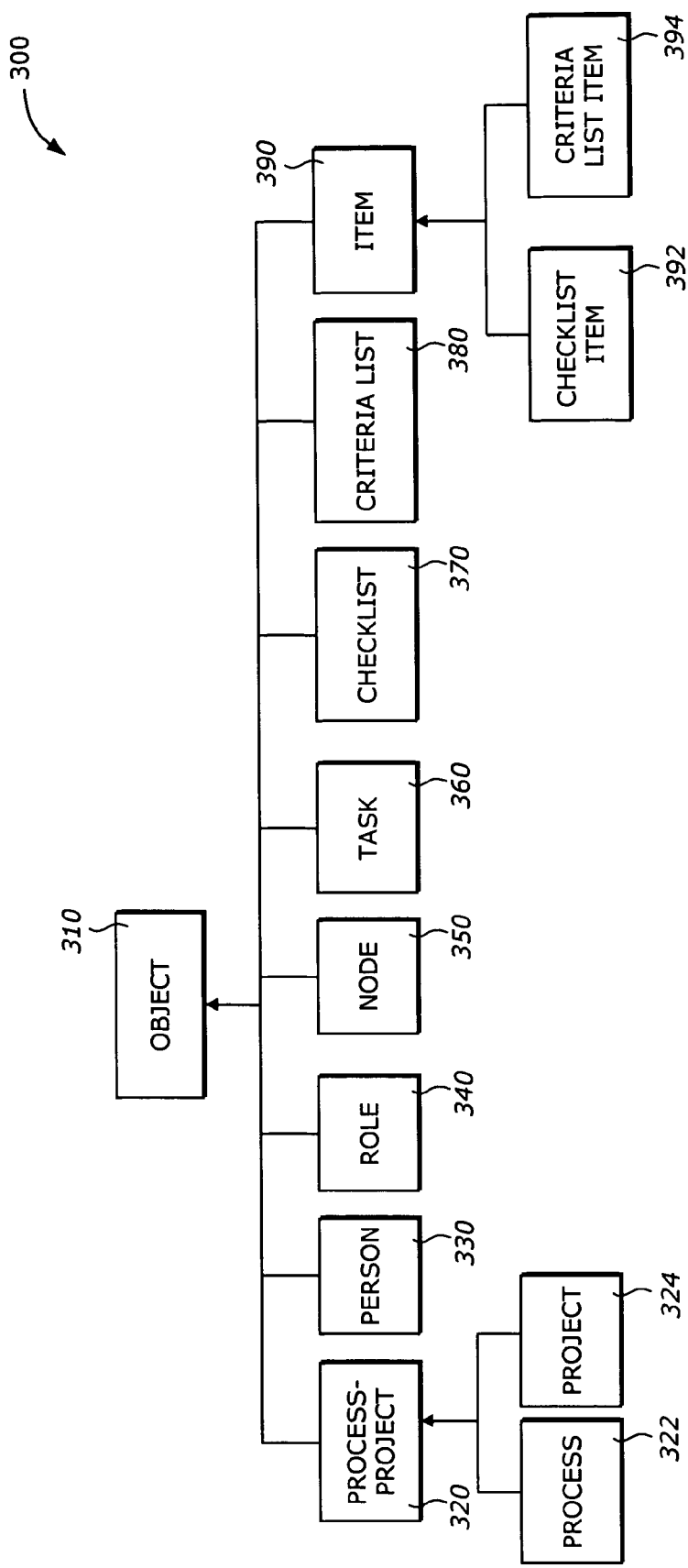
FIG. 3 is a diagram illustrating a hierarchical project model according to one embodiment of the invention.

FIG. 3 is a diagram illustrating a hierarchical project model 300 according to one embodiment of the invention. The hierarchical project model 300 is a CBDD repository model that stores the process and project configurations. It includes several supertypes or types defined for the project management. In one embodiment, these types include a supertype Object 310, a type Process-Project 320, a type Person 330, a type Role 340, a type Node 350, a type Task 360, a type CheckList 370, a type CriteriaList 380, and a type Item 390. The type Process-Project 320 has a subtype Process 322 and a subtype Project 324. The type Item 390 has a subtype CheckList Item 392 and a subtype CriteriaList Item 394.

The supertype Object 310 allows common features, such as name, to be defined once for its subtypes.

The type Process-Project 320 is a supertype of the Process 322 and the Project 324. It allows common features of these types to be defined once. The Process 322 represents a complete or entire process used to run a project. Usually, a process is defined once and is used for many projects. The Project 324 models a real-world project that the team is working on. Person 330 represents a person, a team member, a user, a project member, or an entity who is assigned to carry out a project task. The Role 340 models similar jobs or roles performed by various project members. Examples of roles are programmer, technician, project manager, draftsman, etc. The Node 350 represents a phase, a category, or an activity of a project. The Task 360 represents the actual work items that project members carry out. Examples of tasks are installation of test routines, verification of algorithm correctness, optimization of codes, etc. Tasks typically belong to a particular phase represented by the Node 350. CheckList 370 provides for lists of items that are checked off as a project is completed. The CriteriaList 380 provides for lists of entry and exit criteria that are accomplished before a project transitions from one phase to another phase. The Item 390 provides a supertype for the CheckList Item 392 and the CriteriaList Item 394. It allows common features of these types to be defined once. The CheckList Item 392 represents the individual checklist items contained in a checklist. The CriteriaList Item 394 represents the individual criteria contained in a criteria list. The criteria may include entry and exit criteria.

The CBD&D Document Review Utility is made up of five components: (1) A set of notifications that are sent out to document review participants at various times in the review lifecycle. The notifications are all sent out by the CBD&D Notification Service at specified times during the lifetime of the review; (2) The portion of the CBD&D repository model used to store document review information in UREP; (3) The document review task of the CBDD Daemon utility program; (4) The DocumentReview.jsp web-wizard for starting and modifying a document review; and (5) The ReviewSignoff.jsp web-wizard that allows approvers and reviewers to sign-off on the document review.

Figure 4:
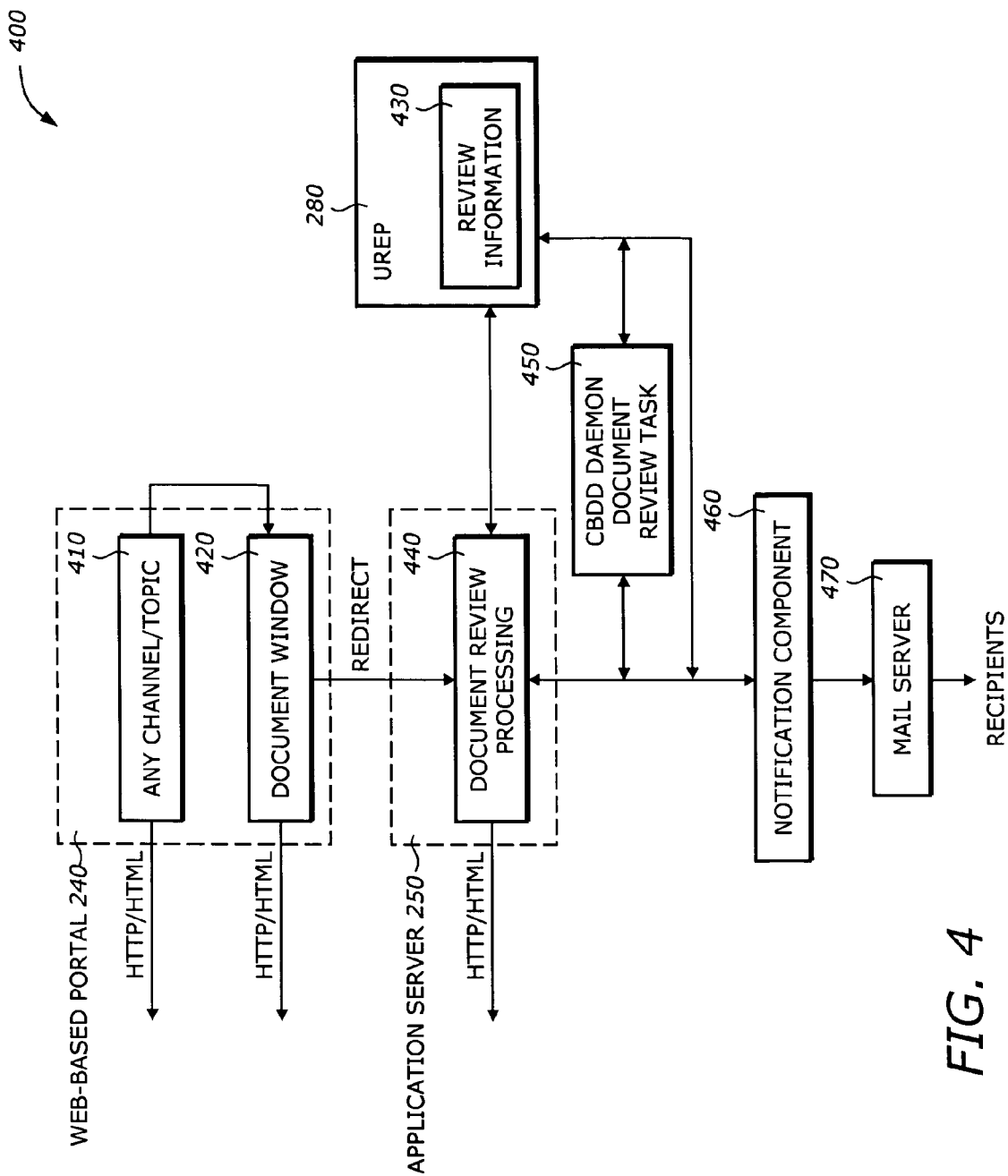
FIG. 4 is a diagram illustrating a design model for document review according to one embodiment of the invention.

FIG. 4 is a diagram illustrating a design model 400 for document review according to one embodiment of the invention. The design model 400 includes a channel/topic 410, a document window 420, a review information 430, a document review processing 440, a document review task 450, a notification component 460, and a mail server 470.

The channel/topic 410 and the document window 420 are located in the web-based portal 240. The channel/topic 410 refers to any channel or topic selected by the user. From this, the user can be re-directed to the document window 420. The document window 420 is an ASP page used to view a document that has been published on the web-based portal portal. It also allows users to view and update the document profile, download the document, and participate in on-line discussions about the document.

The review information 430 includes information on upcoming, on-going, and completed document reviews. It is stored in database or repository. The document review processing 440 processes the document review using the review information.

The document review task 450 is located in the CBDD Daemon 250. The CBDD Daemon 250 utility program is a utility program always running on the portal. Its purpose is to send timed notifications to various portal users on behalf of several CBD&D functional areas. The CBDD Daemon 250 is a command line utility program. It contains a "timed" task for each of the functional areas that it serves. When the utility is fired up, runs each of the "timed" tasks once, and sets a separate system timer for each of the tasks that must be "timed". When each timer fires, the corresponding task is executed again and the timer is reset to the same interval. Each task can be timed to run at different intervals and completely independently of each other. For document review, the corresponding task is the document review task 450. The document review task 450 of the CBDD Daemon 250 performs many operations. First, it calls the repository and retrieves all instances of the document review type. Second, it iterates over all of the instances of the document review type. For each instance, it determined whether or not the document review has started yet, and if so, whether or not the document review has been completed yet. For each document review that is currently ongoing, it determines if any of the notifications for this document review have NOT yet been sent. For each such notification or set of notifications, it determines if that notification or set of notifications is due to be sent today. For each notification or set of notifications that is due to be sent, it (1) gathers all information needed to complete the notification text, such as project name, document title, author's name and e-mail address, etc., (2) determines the recipient list for each notification to be sent and gathers their e-mail addresses, (3) logs each notification that is sent and the list of recipients, and (4) calls the notification component 460, passing it all necessary information so that it can send the correct notification to the correct list of recipients.

The notification component 460 receives the notification requests from the document review task 450 and/or the document review processing 440, formats into mail messages, and then sends to the mail server. The mail server 470 is a server to process mail requests and distributes or sends the mails to recipients.

Figure 5:
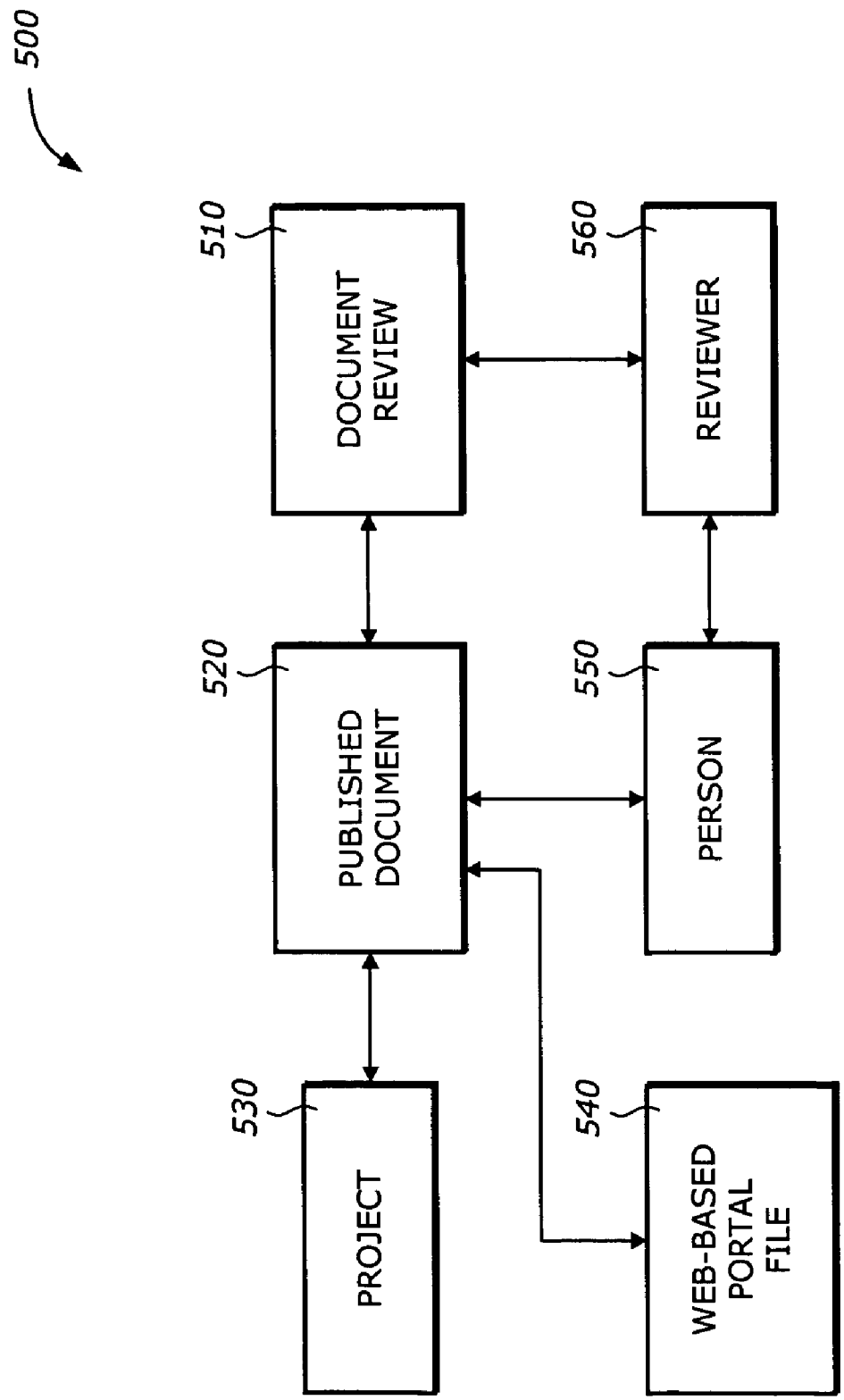
FIG. 5 is a diagram illustrating a document review association model according to one embodiment of the invention.

FIG. 5 is a diagram illustrating a document review association model 500 according to one embodiment of the invention. The association model 500 includes a document review 510, a published document 520, a project 530, a web-based portal (KC) file 540, a person 550, and a reviewer 560. These elements are objects in the CBDD design model.

There are four main associations: (1) project—published document: this association is between the project 530 and the published document; (2) published document-person: this association is between the published document 520 and the person that authored the document 550; (3) published document—document review: this association is between the published document 520 and the document review 510; and (4) document review—reviewers: this association is between the document review 510 and the reviewer 560.

These associations are actually instances of the traceability link association specified in the project traceability portion of the CBD&D model. By making these associations instances of the traceability link, users will be able to use the CBD&D traceability functionality to navigate from projects (1) to the documents published for those projects, (2) to the authors of those documents, (3) to the document reviews held for each document, and (4) to the designated reviewers in each document review. In addition, users will be able to display pertinent information about those published documents, authors, document reviews and reviewers.

Figure 6:
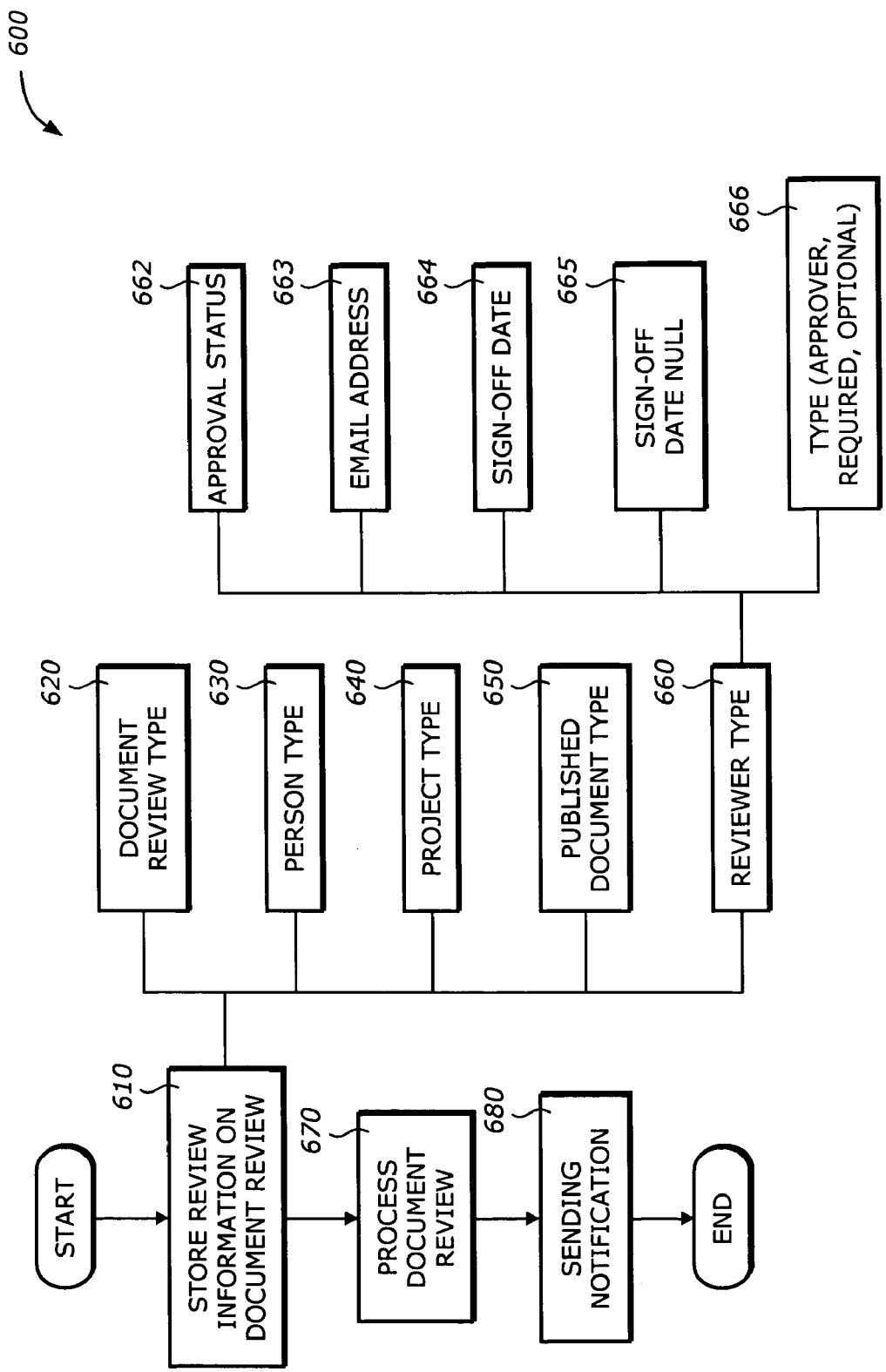
FIG. 6 is a flow diagram illustrating a process to automate document review according to one embodiment of the invention.

FIG. 6 is a flow diagram illustrating a process 600 to automate document review according to one embodiment of the invention.

Upon START, the process 600 stores the review information on the document review in a repository (Block 610). The document review is associated with a project in a project management system. The review information includes a document review type 620, a person type 630, a project type 640, a published document type 650, and a reviewer type 660. The document review type 620 has a number of attributes (shown in FIG. 7) on the type of the document review. The person type 630 represents the people, staff personnel, team members, or project members who are involved in the project. It is noted that a person may work on several projects. The project type 640 contains information about the project. The published document type 650 stores information about the various versions of the documents that are published to the portal. The reviewer type 660 specifies who the reviewers of a document review are. Each instance of the reviewer type 660 can associate one and only one of the two following items to the instance of the document review type to which it belongs: (1) the project staff member or portal user that acts as an individual reviewer, and (2) the email address of an individual reviewer that is not associated with either the project or the portal. The reviewer type 660 has a number of attributes: an approval status 662, an e-mail address 663, a sign-off date 664, a sign-off date null 665, and a type (approver, required, and optional) 666. The approval status 662 indicates whether an approver has approved the document. This attribute is not used for optional or required reviewers. The e-mail address 663 identifies the SMTP e-mail address of an individual reviewer that is neither a project staff member nor a portal user. The sign-off date 664 indicates the date on which the reviewer signed off on the document. The sign-off date null 665 indicates whether or not the sign-off date attribute contains a meaningful value. If set to true, also indicates that this reviewer has not yet signed off on the document review.

The type 666 indicates the type of the reviewer as one of an approver, a required reviewer, and an optional reviewer.

Then, the process 600 processes the document review (Block 670). This includes allowing the user to select reviewers, review dates, and to sign off the review document. Next, the process 680 sends notifications to various recipients (Block 680). The notifications are sent based on a run-time utility that periodically checks the various review dates with the current time and date. The process 600 is then terminated.

Figure 7:
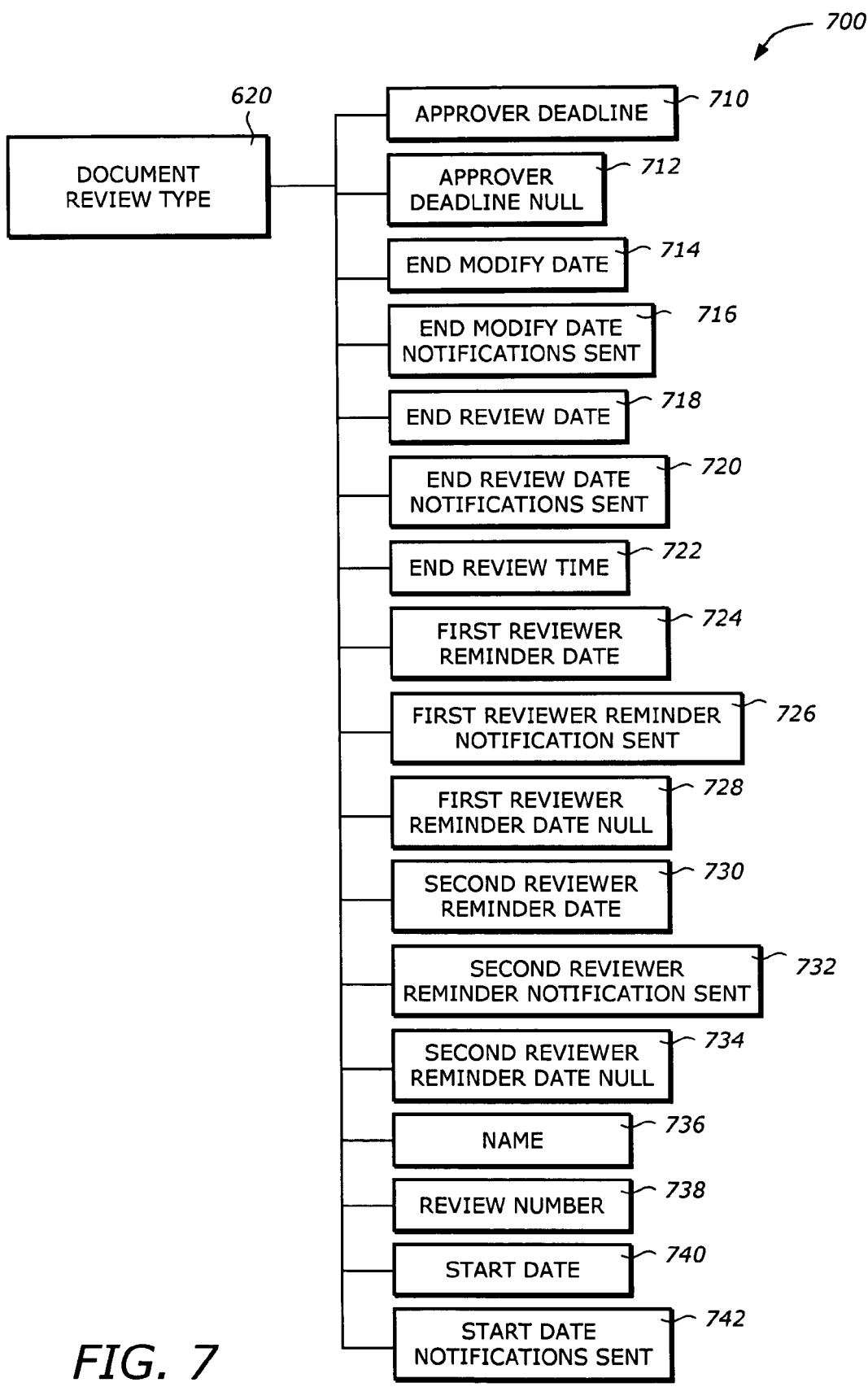
FIG. 7 is a diagram illustrating a document review type according to one embodiment of the invention.

FIG. 7 is a diagram illustrating a document review type 620 according to one embodiment of the invention. The document review type 620 includes an approver deadline 710, an approver deadline null 712, an end modify date 714, an end modify date notifications sent 716, an end review date 718, an end review date notifications sent 720, an end review time 722, a first reviewer reminder date 724, a first reviewer reminder notifications sent 726, a first reviewer reminder date null 728, a second reviewer reminder date 730, a second reviewer reminder notifications sent 732, a second reviewer reminder date null 734, a name 736, a review number 738, a start date 740, and a start date notifications sent 742.

The approver deadline 710 indicates the last date on which designated reviewers of type Approver may change their Approved/Not Approved sign-offs. The user that creates the document review may set this to any desired date as long as it comes after the start date. The approver deadline null 712 indicates whether or not the approver deadline 710 attribute is valid for this document review. The end modify date 714 is the date on which the author is scheduled to complete review of all reviewer comments and complete the updates to the document. The end modify date notifications sent 716 is a status information. When TRUE, the Document Review Task of the CBDD Daemon 450 (FIG. 4) has already sent out the "End of Responses/Modification Period" notifications for this document review. Otherwise, these notifications have not yet been sent. The end review date 718 is the date on which the review portion of the document review is scheduled to end. The end review date notifications sent 720 is a status information. When TRUE, the Document Review Task of the CBDD Daemon has already sent out the "End of Review" (including the separate versions for Approvers, Required Reviewers, Optional Reviewers and Author versions) notifications for this document review. Otherwise, these notifications have not yet been sent. The end review time 722 is the time at which the review portion of the document review is scheduled to end. This time is relative to the end review date value. The first reviewer reminder date 724 is the date on which the first reviewer reminder notification is to be sent to all reviewers. The first reviewer reminder notifications sent 726 is a status information. When TRUE, the Document Review Task of the CBDD Daemon has already sent out the "First Reviewer Reminder" notifications for this document review. Otherwise, these notifications have not yet been sent. The first reviewer reminder date null 728 indicates whether or not the first reviewer reminder date attribute is valid for this document review. The second reviewer reminder date 730 is the date on which the second reviewer reminder notification is to be sent to all reviewers. The second reviewer reminder notifications sent 732 is status information. When TRUE, the document review task of the CBDD Daemon has already sent out the "Second Reviewer Reminder" notifications for this document review. Otherwise, these notifications have not yet been sent. The second reviewer reminder date null 734 indicates whether or not the second reviewer reminder date attribute is valid for this document review. The name 736 includes document name, a delimiter (e.g., "_"), and a review number. The document name is the name of the published document instance to which this document review belongs, and the review number is the value of the review number attribute. The review number 738 is a unique integer value that uniquely identifies the separate document reviews of a single published document instance. The start date 740 is the date on which the document review is scheduled to begin. The start date notifications sent 742 is status information. When TRUE, the document review task of the CBDD Daemon has already sent out the "Review Started" and "Start Review" notifications for this document review. Otherwise, these notifications have not yet been sent.

Figure 8:
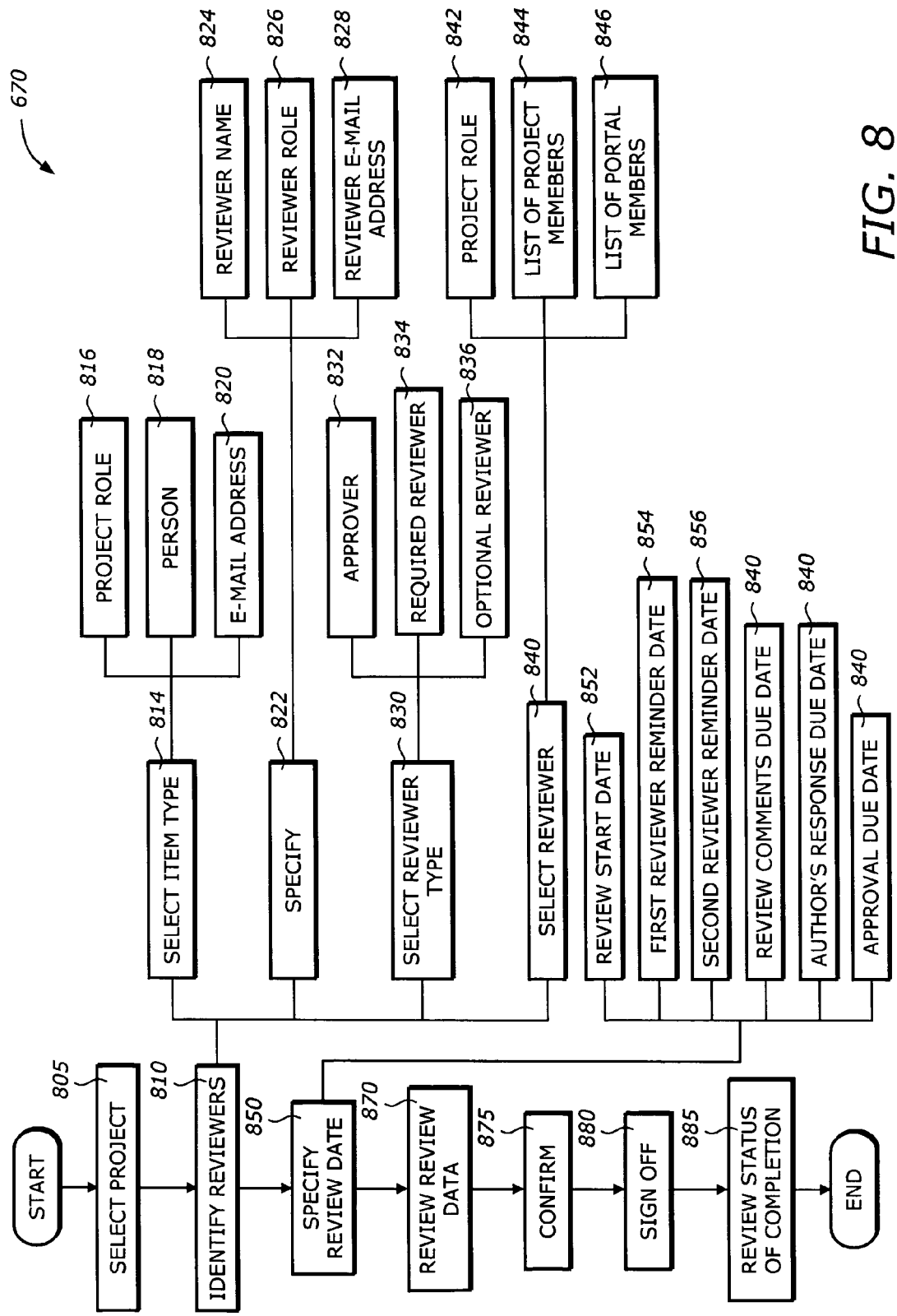
FIG. 8 is a flow diagram illustrating a process to process document review according to one embodiment of the invention.

FIG. 8 is a flow diagram illustrating the process 670 to process document review according to one embodiment of the invention.

Upon START, the process 670 selects a project from a list of all projects currently running on the portal (Block 805). Then the process 670 identifies the reviewers (Block 810). In this operation, the process 670 selects an item type (Block 814), specifies an attribute (Block 822), selects a reviewer type (Block 830), and selects a reviewer (Block 840). In Block 814, an item type indicates a project role 816, an actual person 818, or the SMTP e-mail address 820 of a person. When the project role 816 is selected as a reviewer type, all of the members of that role will be asked to review the document. Or, the user can select specific people attached to the project or other portal users as reviewers. Finally, by stipulating the SMTP e-mail address 820, the author can request a person not associated with either the project or the portal to review the document. Note that if the persons identified by e-mail address do not have access to the portal, the user has to supply a separate copy of the document for that person to review and that person will not be able participate in any discussion of the document that occurs on the portal. And, an e-mail address reviewer will need to have access to the portal in order to use the automated document review sign-off functionality. In block 822, the attribute may be one of a reviewer name 824, a reviewer role 826, and a reviewer e-mail address 828. In Block 830, there are three reviewer types: an approver 832, a required reviewer 834, and an optional reviewer 836. The approver 832 is a reviewer who approves a document before further work based on the document can go forward. The required reviewer 834 is a reviewer who is required to review the document before further work based on the document can go forward. Required reviewers are not required to approve the document (and thereby given the ability to veto further work). However, they are required to formally sign-off that they have completed the review of the document. The optional reviewer 836 is the default value for all new reviewers added to the document review. The optional reviewer 836 is one that is asked to review the document either as a courtesy or because the author values that reviewers advice and expertise. Optional reviewers are not required to sign-off on the document in any way. In Block 840, the process 670 selects a reviewer from a project role 842, a list of project members 844, or a list of portal members 846.

Then, the process 670 specifies a review date (Block 850). There dates include a review start date 840, a first reviewer reminder date 854, a second reviewer reminder date 856, a reviewer comments due date 860, an author's response due date 862, and an approval due date 864. The review start date 840 is the date on which the document review should begin. This value may default to the current date. The user may change it manually or may select from a calendar. This date contains a valid date greater than or equal to the date on which document being reviewed was published to the portal. The first reviewer reminder date 854 is the date on which the first of two possible reviewer reminder notifications are to be sent out to all reviewers. This value may default to the date one week after the review start date default. The user may change it manually or may select from a calendar. The user can set this date to an empty value specifying that the first reviewer reminder notifications will not be sent out. If a date is entered into this date, it is greater than the review start date 840. Note that if the user elects to send this notification, it will only be sent to reviewers that have not signed-off on the review on the specified date. The second reviewer reminder date 856 is the date on which the second of two possible reviewer reminder notifications is to be sent out to all reviewers. This value may default to the date three days prior to the default for the review comments due date 860. However, if the user changes the first reviewer reminder date 854 to an empty value, the default for this control will also be changed to an empty value this control will become read-only, and the calendar icon associated with this control will also become unavailable. If the date is mutable, the user may change it manually or may select from a calendar. This is also an optional date. Therefore, the user can set this date to an empty value specifying that the second reviewer reminder notifications will not be sent out. If a date is entered into this control, it is greater than the first reviewer reminder date 854. Note that if the user elects to send this notification, it will only be sent to reviewers that have not signed-off on the review on the specified date. The reviewer comments due date 860 has three significant meanings: (1) It is the date on which the actual document review ends; (2) It is the date on which the Author's Response Period begins; and (3) It is the last date on which reviewers may signoff on completion of the document review. This date may default to the date two weeks after the review start date default. The user may change it manually or may select from a calendar. This date contains a valid date greater than the review start date 852. If s first reviewer reminder date 854 is specified, then this date is also greater than that date. Likewise, if a second reviewer reminder date 856 is specified, then this date is greater than that date also. The author's response due date 862 is the date on which the author's responses to the document review comments are due. This may or may not also be the date on which the author republishes the new version of the document incorporating any changes brought about by reviewer comment. This date may default to the date three weeks after the review start date default. The user may change it manually or may select from a calendar. This date contains a valid date greater than the review comments due date 860. The approval due date 864 is the date by which designated reviewers of type Approver signs-off that they either approve or do not approve the document. After this date, approvers will no longer be allowed to modify their sign-offs of the document review. The user that starts the document review may set this date to any desirable date as long as it occurs after the start date 852 of the document review. When this date does appear on the page, it may contain a default value equal to the author's responses due date 862. The user may change this date manually or select from a calendar. This item appears on the page if at least one of the designated reviewers of the document review has been specified to be an approver of the document.

Next, the process 670 reviews the review data (Block 870). The review data may contain values to indicate whether an item is blank or no change was made, added, deleted, or changed. Then, the process 670 confirms the review data (Block 875). Any errors may be displayed. Next, the process 670 signs off the document review (Block 880). The document reviewers signs off on completion of their review. All other interested users may also review the current status of their completions. Designated approvers of the document may (1) indicate whether or not he approves the document he has reviewed. Doing this automatically records the completion of the review for that user; (2) change a previous Approval to Not Approved and vice versa, (3) retract the completion of the review (e.g., set the Approval status and the date completed to "not specified". Designated required reviewers may indicate completion of the review of the document as required. Designated optional reviewers may indicate completion of the review of the document even though not required to do so. Required and optional reviewers may also retract the completion of the review. In addition, all users may review the current settings for all reviewers of the document.

Then, the process 670 reviews the status of the completion (Block 885) and is then terminated.

Figure 9:
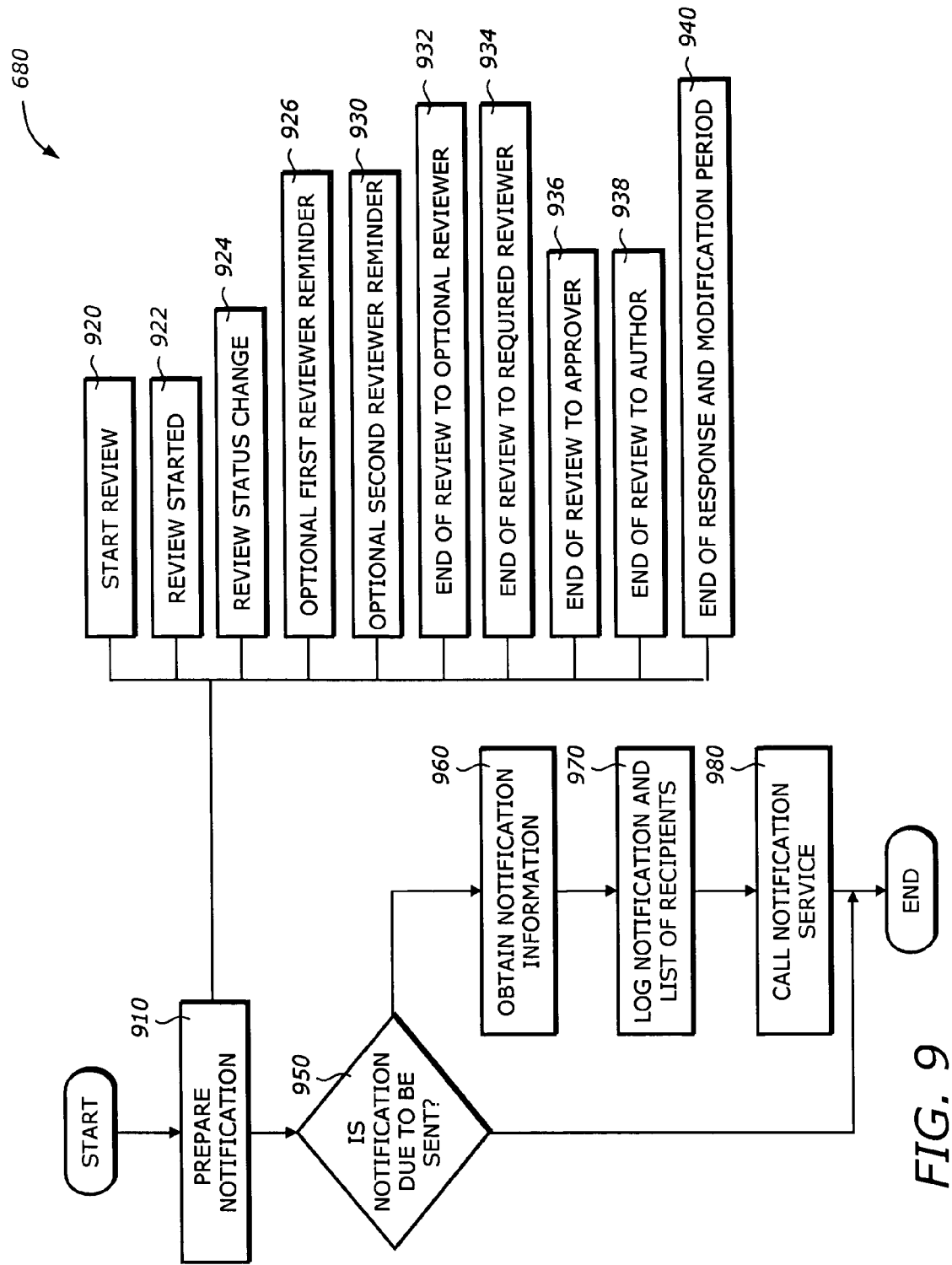
FIG. 9 is a flow diagram illustrating a process to send a document review notification according to one embodiment of the invention.

FIG. 9 is a flow diagram illustrating the process 680 to send a document review notification according to one embodiment of the invention.

Upon START, the process 680 prepares a notification (Block 910). The notification may be a start review notification 920, a review started notification 922, a review status change notification 924, an optional first reviewer reminder notification 926, an optional second reviewer reminder notification 930, an end of review to optional reviewer notification 932, an end of review to required reviewer notification 934, an end of review to approver notification 936, an end of review to author notification 938, and an end of response and modification period notification 940. The start review notification 920 is sent to each designated reviewer of the document at the beginning of the document review. The review started notification 922 is sent to the author of the document at the start of the document review. There are three purposes for this notification: (1) it acts as a confirmation to the author that the review document utility has signaled the start of the review cycle; (2) the author may run the utility to start the document review at some date previous to the actual start date. Therefore, the notification signals to the author that the start date has been reached; and (3) the document review may have been created and started by the project manager instead of the author. Thus, the author is informed of the start of the document review. The review status change notification 924 is sent to designated reviewers when the author changes the reviewer's reviewer type. The optional first reviewer reminder notification 926 is sent to each designated reviewer at some point during the review period. Its purpose is to serve as a reminder to the reviewers that the review period is passing and that attention should be paid to this task. The person starting the review process specifies if and when the notification is actually sent. However, it will normally default to approximately halfway through the review period. If the person starting the review elects to send this notification, it will only be sent to reviewers that have not signed-off on the review at the time the notification is triggered. The optional second reviewer reminder notification 930 is sent to each designated reviewer at some point during the review period. Its purpose is to serve as a second reminder to the reviewers that the review period is passing and that attention should be paid to this task. The person starting the review process specifies if and when the notification is actually sent. However, it will normally default to approximately three days before the end of the review period. If the person starting the review elects to send this notification, it will only be sent to reviewers that have not signed-off on the review at the time the notification is triggered. The optional reviewer notification 932 is sent to optional reviewers at the end of the review period. If the author has not designated specific approvers or required approvers, then all reviewers are optional reviewers. Its purpose is to inform the optional reviewers that the review period has passed and to thank them for their efforts to review the document. The end of review to required reviewer notification 934 is sent to required reviewers at the end of the review period. Its purpose is to inform the required reviewers that the review period has passed, to thank them for their efforts to review the document, and to remind them to submit their required reviewer signoff. The end of review to approver notification 936 is sent to approvers at the end of the review period. Its purpose is to inform the approvers that the review period has passed, to thank them for their efforts to review the document, and to remind them to submit their approver signoff. The end of review to author notification 938 is sent to the author at the end of the review period. Its purpose is to remind the author that the review period has passed and that it is now time to respond to all online comments from the various reviewers. It is also now time for the author to make any needed modifications to the document. Note, that it is not the intent of this design to preclude the author from carrying out these functions as the comments are submitted to the online discussion. However, for those authors who want to work that way, this message will act as a reminder that it is time for that process to begin. Further, even for some authors who respond to online comments as they are submitted and modify the document at the same time, might need the reminder that it is now time to finish that process and republish the modified document. The end of response and modification period notification 940 is sent to the author at the end of the period in which she responds to reviewer comments and makes necessary modifications to the document. Its purpose is to remind the author that the response period has passed and that it is now time to republish the modified document on the portal. If no modifications were needed to the document, that latter action will not be necessary.

Then, the process 680 determines if a notification is due to be sent (Block 950). This is performed by a CBDD daemon utility program that runs at all times on the portal. The operation goes through the list of all types of notifications as above. For each notification, compare the due date with the current time/date. If a notification is not due, the process 680 is terminated. Otherwise, if any of the notifications is due, the process 680 obtains the notification information (Block 960). Then, the process 680 logs the notification and the list of the recipients (Block 970). Next, the process 680 calls the notification service to process sending out the notification (Block 980) and is then terminated.

While the invention has been described in terms of several embodiments, those of ordinary skill in the art will recognize that the invention is not limited to the embodiments described, but can be practiced with modification and alteration within the spirit and scope of the appended claims. The description is thus to be regarded as illustrative instead of limiting.

What is claimed is:

1. A method comprising:
   redirecting a user of a portal to an application server;
   processing a document review by the user in the application server using review information stored in a repository, the document review being associated with a project module in a project management application and corresponding to a document review task in a daemon utility program running on the portal; and sending a notification of the document review via a mail server.

2. The method of claim 1 wherein the document review is one of an upcoming, on-going, and completed document review, and the review information includes at least one of a review association, a document review type, a person type, a project type, a published document type, and a reviewer type.

3. The method of claim 1 wherein processing comprises:
selecting a project from a project list;
identifying a reviewer;
specifying a review date;
reviewing the review data; and
confirming the document review.

4. The method of claim 3 wherein identifying the reviewer comprises:
selecting an item type being one of a project role, a person, and an e-mail address;
specifying one of a reviewer name, a reviewer role, and a reviewer email address; and
selecting a reviewer type being one of an approver, a required reviewer, and an optional reviewer.

5. The method of claim 3 wherein identifying the reviewer further comprises:
selecting the reviewer based on one of the project role associated with the project, a list of project members, and a list of portal members.

6. The method of claim 3 wherein specifying the review date comprises:
specifying one of a review start date, a first reviewer reminder date, a second reviewer reminder date, a review comments due date, an author's response due date, and an approval due date.

7. The method of claim 3 wherein processing further comprises:
signing off on completion of review; and
reviewing status of the completion.

8. The method of claim 1 wherein sending the notification comprises:
sending the notification being one of a start review notification, a review started notification, a review status change notification, an optional first reviewer reminder notification, an optional second reviewer reminder notification, an end of review to optional reviewer notification, an end of review to required reviewer notification, an end of review to approver notification, an end of review to author notification, and an end of response and modification period notification.

9. The method of claim 8 wherein sending the notification comprises:
determining if the notification is due to be sent;
obtaining notification information on the notification, the notification information including a list of recipients and at least one of a project name, a document title, an author's name, aid an author's e-mail address;
logging the notification and the list of recipients; and
calling a notifications service using the notification.

10. The method of claim 1 wherein processing the document review comprises:
processing the document review using a Java Server Page (JSP) page.

11. An article of manufacture comprising:
a machine-accessible medium including data that, when accessed by a machine, causes the machine to perform operations comprising:
redirecting a user of a portal to an application server;
processing a document review by the user in the application server using review information stored in a repository, the document review being associated with a project module in a project management application and corresponding to a document review task in a daemon utility program running on the portal; and
sending a notification of the document review via a mail server.

12. The article of manufacture of claim 11 wherein the document review is one of an upcoming, on-going, and completed document review, and the review information includes at least one of a review association, a document review type, a person type, a project type, a published document type, and a reviewer type.

13. The article of manufacture of claim 11 wherein processing comprises wherein the data causing the machine to perform data that, when accessed by the machine, causes the machine to perform operations comprising:
selecting a project from a project list;
identifying a reviewer;
specifying a review date;
reviewing the review data; and
confirming the document review.

14. The article of manufacture of claim 13 wherein identifying the reviewer comprises wherein the data causing the machine to perform data that, when accessed by the machine, causes the machine to perform operations comprising:
selecting an item type being one of a project role, a person, and an e-mail address;
specifying one of a reviewer name, a reviewer role, and a reviewer email address; and
selecting a reviewer type being one of an approver, a required reviewer, and an optional reviewer.

15. The article of manufacture of claim 13 wherein identifying the reviewer further comprises wherein the data causing the machine to perform data that, when accessed by the machine, causes the machine to perform operations comprising:
selecting the reviewer based on one of the project role associated with the project, a list of project members, and a list of portal members.

16. The article of manufacture of claim 13 wherein specifying the review date comprises wherein the data causing the machine to perform data that, when accessed by the machine, causes the machine to perform operations comprising:
specifying one of a review start date, a first reviewer reminder date, a second reviewer reminder date, a review comments due date, an author's response due date, and an approval due date.

17. The article of manufacture of claim 13 wherein processing further comprises wherein the data causing the machine to perform data that, when accessed by the machine, causes the machine to perform operations comprising:
signing off on completion of review; and
reviewing status of the completion.

18. The article of manufacture of claim 11 wherein sending the notification comprises wherein the data causing the machine to perform data that, when accessed by the machine, causes the machine to perform operations comprising:

sending the notification being one of a start review notification, a review started notification, a review status change notification, an optional first reviewer reminder notification, an optional second reviewer reminder notification, an end of review to optional reviewer notification, an end of review to required reviewer notification, an end of review to approver notification, an end of review to author notification, and an end of response and modification period notification.

19. The article of manufacture of claim 18 wherein sending the notification comprises wherein the data causing the machine to perform data that, when accessed by the machine, causes the machine to perform operations comprising:

determining if the notification is due to be sent;
obtaining notification information on the notification, the notification information including a list of recipients and at least one of a project name, a document title, an author's name, and an author's e-mail address;
logging the notification and the list of recipients; and
calling a notifications service using the notification.

20. The article of manufacture of claim 11 wherein processing the document review comprises wherein the data causing the machine to perform data that, when accessed by the machine, causes the machine to perform operations comprising:

processing the document review using a Java Server Page (JSP) page.

21. A system comprising:
a processor; and
a memory coupled to the processor, the memory containing instructions that, when executed by the processor, cause the processor to:
redirect a user of a portal to an application server;
process a document review by the user in the application server using review information stored in a repository, the document review being associated with a project module in a project management application and corresponding to a document review task in a daemon utility program running on the portal; and
send a notification of the document review via a mail server.

22. The system of claim 21 wherein the document review is one of an upcoming, on-going, and completed document review, and the review information includes at least one of a review association, a document review type, a person type, a project type, a published document type, and a reviewer type.

23. The system of claim 21 wherein the instructions causing the processor to process comprises instructions that, when executed by the processor, cause the processor to:
select a project from a project list;
identify a reviewer;
specify a review date;
review the review data; and
confirm the document review.

24. The system of claim 23 wherein the instructions causing the processor to identify the reviewer comprises instructions that, when executed by the processor, cause the processor to:

select an item type being one of a project role, a person, and an e-mail address;
specify one of a reviewer name, a reviewer role, and a reviewer email address; and
select a reviewer type being one of an approver, a required reviewer, and an optional reviewer.

25. The system of claim 23 wherein the instructions causing the processor to identify the reviewer further comprises instructions that, when executed by the processor, cause the processor to:
select the reviewer based on one of the project role associated with the project, a list of project members, and a list of portal members.

26. The system of claim 23 wherein the instructions causing the processor to specify the review date comprises instructions that, when executed by the processor, cause the processor to:
specify one of a review start date, a first reviewer reminder date, a second reviewer reminder date, a review comments due date, an, author's response due date, and an approval due date.

27. The system of claim 23 wherein the instructions causing the processor to process further comprises instructions that, when executed by the processor, cause the processor to:
sign off on completion of review; and
review status of the completion.

28. The system of claim 21 wherein the instructions causing the processor to send the notification comprises instructions that, when executed by the processor, cause the processor to:
send the notification being one of a start review notification, a review started notification, a review status change notification, an optional first reviewer reminder notification, an optional second reviewer reminder notification, an end of review to optional reviewer notification, an end of review to required reviewer notification, an end of review to approver notification, an end of review to author notification, and an end of response and modification period notification.

29. The system of claim 28 wherein the instructions causing the processor to send the notification comprises instructions that, when executed by the processor, cause the processor to:
determine if the notification is due to be sent;
obtain notification information on the notification, the notification information including a list of recipients and at least one of a project name, a document title, an author's name, and an author's e-mail address;
log the notification and the list of recipients; and
call a notifications service using the notification.

30. The system of claim 21 wherein the instructions causing the processor to process the document review comprises instructions that, when executed by the processor cause the processor to:
process the document review using a Java Server Page (JSP) page.

* * * * *